United States Patent Office 3,067,211
Patented Dec. 4, 1962

3,067,211
PERCHLORYL AROMATIC COMPOUNDS
Charles E. Inman, Glenside, Robert E. Oesterling, Flourtown, and Edward A. Tyczkowski, Abington, Pa., assignors to Pennsalt Chemicals Corporation, Philadelphia, Pa., a corporation of Pennsylvania
No Drawing. Filed Sept. 24, 1958, Ser. No. 762,906
11 Claims. (Cl. 260—350)

This invention relates to a novel class of derivatives of perchloryl fluoride and to a process for their preparation. More specifically it pertains to perchlorylaromatic compounds.

Perchloryl fluoride, $ClO_3F$, whose structural formula is

is a surprisingly stable fluorine derivative of perchloric acid. (H. Bode and E. Klesper, Zeitschrift für anorganische und allgemeine Chemie, 255, 275 (1951) and A. Engelbrecht and E. Atzwanger, Monatshefte für Chemie, 83, 1087 (1952).) Its chemical reactivity with organic compounds has previously been unknown.

We have now discovered a series of novel aromatic compounds derived by the reaction of perchloryl fluoride with certain aromatic compounds. We have found that the fluorine atom of perchloryl fluoride can be replaced with a substituted or unsubstituted aryl radical to form a primary class of hitherto unknown compounds identified as perchlorylaromatic compounds.

We have further found that stubstituents can be introduced into the aryl radical of our primary perchlorylaromatic compounds to form, as a secondary class, a wide variety of derivatives of our primary perchlorylaromatic compounds. Furthermore we have found that a compound of our secondary class of perchlorylaromatic compounds can be reacted to form other compounds of the primary class thus providing an alternative route to certain of these compounds. By a series of reactions, including reaction with perchloryl fluoride at an appropriate stage, a wide range of perchlorylaromatic compounds can thus be produced, embracing essentially the entire field of aromatic chemistry. As the result of our discovery, therefore, a new organic unit process, perchlorylation, may now take its place alongside nitration, sulfonation, diazotization, etc., in the synthesis of new aromatic compounds.

The compounds of our invention have the formula

wherein Ar is a substituted or unsubstituted aromatic radical.

The group Ar may represent the substituted or unsubstituted aromatic radical derived from an aromatic compound which is directly capable of entering into a chemical reaction with perchloryl fluoride, e.g., benzene or chlorobenzene. Ar may also represent a substituted aromatic radical which can be derived by the chemical reaction of another reactant, e.g., $HNO_3$, with the aromatic radical of a primary perchlorylaryl compound. Furthermore, Ar may represent the substituted or unsubstituted aromatic radical which can be derived by any number of chemical reactions with the substituted or unsubstituted aromatic radical of a primary or secondary perchlorylaromatic compound. Because of the wide variety of compounds which can be derived by treating a reactant compound chosen from either our primary or secondary perchlorylaromatic compounds with another reactant compound according to conventional procedures of aliphatic or aromatic chemical synthesis, it is possible, of course, for many of our perchlorylaromatic compounds to be derived by several chemical routes. For example, 3,4-dichloroperchlorylbenzene can be derived either by reacting 2,3-dichlorobenzene with perchloryl fluoride or by reacting 4-chlorobenzene with perchloryl fluoride and chlorinating the 4-chloroperchlorylbenzene formed to 3,4-dichloroperchlorylbenzene. By way of further example, perchlorylbenzene can be made by perchlorylation of benzene, or by deamination of 3-amino-perchlorylbenzene.

Examples of said aromatic radical Ar, when unsubstituted, are phenyl, biphenylyl, alpha-naphthyl, beta-naphthyl, alpha-anthryl, beta-anthryl, gamma-anthryl, phenanthryl, naphthacyl, chrysyl, pyryl, and triphenylyl.

The aromatic radical Ar, when substituted, may contain from 1 to 5 nuclear substituents. Examples of said substituents are R, where R is alkyl with 1 to 12 carbon atoms, including methyl, ethyl, propyl, butyl, pentyl, hexyl, octyl, nonyl, and dodecyl, including all isomeric forms of the latter seven and the halogenated, oxygenated, esterified, condensed, nitrated, sulfonated, cyanated, aminated, and closed-ring forms of all said alkyls; T, where T is halogen, including bromine, chlorine, fluorine and iodine, phenyl, and nitrophenyl; and Q where Q represents hydroxy; amino; nitro; cyano; thiophenyl; sulfhydryl and —SR where R is the same as defined above; sulfo; —$SO_2X$, where X is halogen as defined above, sulfinyl; sulfonyl; sulfino; halosulfinyl; halosulfonyl; amidosulfinyl; amidosulfonyl; carbamyl; —SOOR where R is the same as defined above; perchlorylaryl; carboxy; nitroso; azo; azoxy; hydrazo; carbalkoxy; —NHCOR, where R is as defined above; —$NHCOC_6H_5$; OR where R is as defined above; phenoxy; —N=NX where X is halogen as defined above; —N(:N)X, where X is halogen as defined above; —COY where Y is halogen as defined above, hydroxy, —OM, where M is sodium, potassium or lithium, phenoxy, R as defined above, amino, phenyl, hydrogen, or OR where R is as defined above; and a radical derived from a heterocyclic compound including the radicals of furan, thiophene, pyrrole, indole, pyridine, piperidine, and quinoline; aryl radical, including phenyl, biphenylyl, naphthyl, α-anthryl, β-anthryl, γ-anthryl, phenanthryl, naphthacenyl, chrysenyl, pyrenyl and triphenylyl, and said aryl radical having R, T and Q substituents.

Our primary perchlorylaromatic compounds comprise those in which Ar is phenyl or substituted phenyl, for example, perchlorylaromatic compounds having the formula

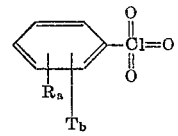

where R and T are the same as defined above, a and b are each a number from 0 to 5, and the sum of a and b is 0 to 5. R and T represent groups which may be present in the aromatic nucleus before introduction of the perchloryl radical. When the sum of a and b is 1, the substituent may be in the 2 or 4 position relative to the perchloryl radical; when the sum is 2, the substituents may be in 2, 5, or 2, 4 or 3, 4 position relative to the perchloryl radical; when the sum is 3, the substituents may be in 2, 4, 5 or 2, 3, 4 or 2, 4, 6 or 3, 4, 5 position relative to the perchloryl radical; and when the sum is 4, the substituents may be in 2, 3, 4, 5 or 2, 3, 4, 6 or 2, 3, 5, 6 position relative to the perchloryl radical.

Our secondary perchlorylaromatic compounds preferably comprise those having the formula

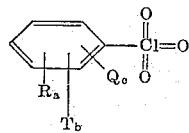

where R, T, and Q are the same as defined above; $a$, $b$, and $c$ are each a number from 0 to 5; and the sum of $a$, $b$, and $c$ is 0 to 5. T represents a substituent which can be introduced into the aromatic nucleus of a primary perchlorylaromatic compound.

The relationships of R, T, Q, $a$, $b$, and $c$ are as shown in the following list in which the numerals under R, T, and Q indicate the position of the substituent indicated at the head of each column with respect to the perchloryl fluoride radical, and the numerals under $a$ and $b$ and $c$ indicate the number of substituents, essentially as shown. For example, if there is an R or T in the number 4 position on the benzene ring, there can be a Q in the number 3 position, or two Q's in the 2 and 5 positions, etc. Similarly, if there are two R's and/or T's in the 2 and 5 position, there can be a Q in the number 3 position, etc.

| R and/or T | a+b | c | Q |
|---|---|---|---|
| 4 | 1 | 0 | 0 |
| 4 | 1 | 1 | 3 |
| 4 | 1 | 2 | 2,5 |
| 4 | 1 | 3 | 2,3,5 |
| 4 | 1 | 4 | 2,3,5,6 |
| 2 | 1 | 0 | 0 |
| 2 | 1 | 1 | 5 |
| 2 | 1 | 2 | 3,5 |
| 2 | 1 | 3 | 3,5,6 |
| 2 | 1 | 2 | 3,4,5 |
| 2 | 1 | 4 | 3,4,5,6 |
| 2,5 | 2 | 0 | 0 |
| 2,5 | 2 | 1 | 3 |
| 2,5 | 2 | 2 | 3,4 |
| 2,5 | 2 | 2 | 3,6 |
| 2,5 | 2 | 3 | 3,4,6 |
| 3,4 | 2 | 0 | 0 |
| 3,4 | 2 | 1 | 5 |
| 3,4 | 2 | 2 | 2,5 |
| 3,4 | 2 | 3 | 2,5,6 |
| 2,4 | 2 | 0 | 0 |
| 2,4 | 2 | 1 | 5 |
| 2,4 | 2 | 2 | 3,5 |
| 2,4 | 2 | 2 | 4,6 |
| 2,4 | 2 | 3 | 3,5,6 |
| 2,4,5 | 3 | 0 | 0 |
| 2,4,5 | 3 | 1 | 3 |
| 2,4,5 | 3 | 2 | 3,6 |
| 3,4,5 | 3 | 0 | 0 |

| R and/or T | a+b | c | Q |
|---|---|---|---|
| 3,4,5 | 3 | 1 | 2 |
| 3,4,5 | 3 | 2 | 2,6 |
| 2,3,4 | 3 | 0 | 0 |
| 2,3,4 | 3 | 1 | 5 |
| 2,3,4 | 3 | 2 | 5,6 |
| 2,4,6 | 3 | 0 | 0 |
| 2,4,6 | 3 | 1 | 3 |
| 2,4,6 | 3 | 2 | 3,5 |
| 2,3,5,6 | 4 | 0 | 0 |
| 2,3,5,6 | 4 | 1 | 4 |
| 2,3,4,5 | 4 | 0 | 0 |
| 2,3,4,5 | 4 | 1 | 6 |
| 2,3,4,6 | 4 | 0 | 0 |
| 2,3,4,6 | 4 | 1 | 5 |
| 2,3,4,5,6 | 5 | 0 | 0 |
| 0 | 0 | 1 | 3 |
| 0 | 0 | 2 | 2,5 |
| 0 | 0 | 2 | 3,5 |
| 0 | 0 | 3 | 2,3,5 |
| 0 | 0 | 4 | 2,3,5,6 |
| 0 | 0 | 5 | 2,3,4,5,6 |

The interrelations of our perchlorylaromatic compounds are substantially as shown in the following chart:

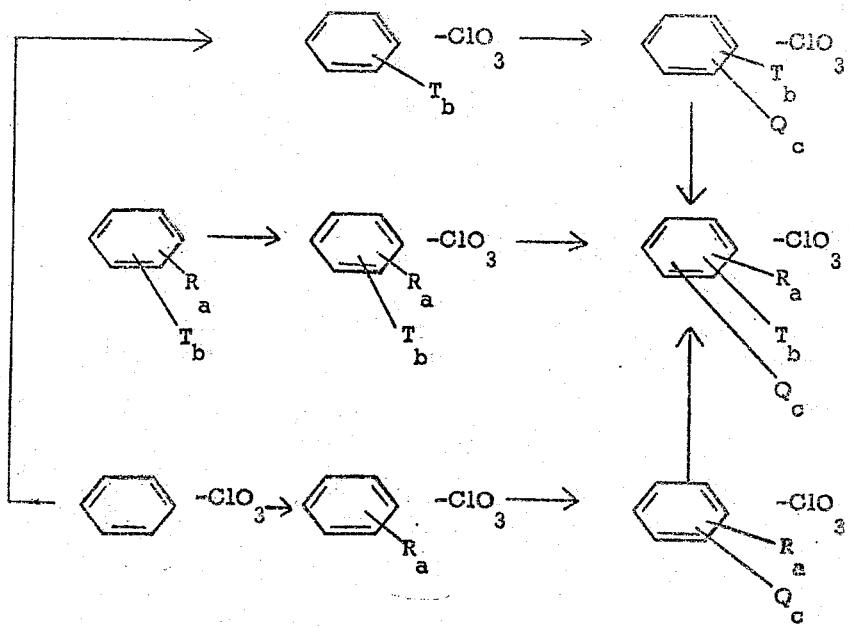

In introducing the first Q group into a primary perchlorylaromatic compound where at least one R or T group is present, the R and/or T group or groups and the perchloryl radical already present influence the position which will be occupied by the Q. In introducing a second or a plurality of additional Q groups, the particular group or groups which can be introduced in the presence of the already present perchloryl, R, T, and Q groups will be influenced, as will the ease of substitution of said new Q group or groups, by the said already present groups. In order to introduce the new Q groups it is necessary, in certain cases, to alter the character of one or more of the already present Q groups in order to permit the new Q group or groups to enter. For example, in the compound

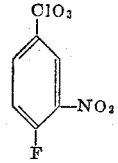

where —NO$_2$ is a Q group, in order to introduce a new —NO$_2$ group into the ring, for example in the 6 position, it is necessary to convert the —NO$_2$ group present in the 3 position to a halide, for example, by reduction, diazotization and halogenation before introducing the new —NO$_2$ group.

As shown by the definition of Q, more than one perchloryl group can be present in the molecule of the perchlorylaromatic compound. The additional perchloryl radical or radicals may be introduced by coupling two or more molecules of a perchlorylaromatic compound.

Examples of our preferred compounds are shown in Table I.

TABLE I

Perchlorylbenzene
3-iodoperchlorylbenzene
3-sulfamidoperchlorylbenzene
3-cyanoperchlorylbenzene
3-carboxyperchlorylbenzene
3-phenoxyperchlorylbenzene
4-chloromethylperchlorylbenzene
4-hydroxymethylperchlorylbenzene
4-dichloromethylperchlorylbenzene
4-trichloromethylperchlorylbenzene
4-trifluoromethylperchlorylbenzene
4-carboxyperchlorylbenzene
4-fluoroperchlorylbenzene
2,5-dimethylperchlorylbenzene
3-nitro-4-methylperchlorylbenzene
3-amino-4-methylperchlorylbenzene
3-bromo-4-methylperchlorylbenzene
2,4-dichloro-5-nitroperchlorylbenzene
4-thiophenylperchlorylbenzene
4-methoxyperchlorylbenzene
3-(β-hydroxynaphthylazo)-perchlorylbenzene
2,4-dimethyl-5-sulfoperchlorylbenzene
3-sulfonylchlorideperchlorylbenzene In the preparation of the primary compounds of our invention, perchloryl fluoride and an aromatic compound capable of supplying an aryl radical are brought together in the presence of a Friedel-Crafts catalyst coupling agent in a substantially non-alkaline non-aqueous system at temperatures not exceeding 280° C. The reaction concerned involves the electrophilic substitution of an aromatic hydrocarbon or a derivative by the perchloryl radical of perchloryl fluoride. The reaction is categorized as perchlorylation, a descriptive term which is in accordance with the usage set forth by the International Union of Pure and Applied Chemistry and approved by the editors of "Chemical Abstracts," a publication of the American Chemical Society.

For the preparation of our primary compounds, we prefer to use benzene or a susbtituted benzene. Examples of substituted benzene include toluene; ethyl benzene; the various xylenes; mono-, di-, and trihalobenzene; and the various chlorotoluenes.

The perchloryl fluoride used in practicing our invention is commercially available, but may be prepared by any means known to the art, such as by reacting potassium chlorate with elemental fluorine or by electrolysis of sodium perchlorate in anhydrous hydrofluoric acid, as described in the cited references.

The stoichiometric reaction between perchloryl fluoride and the aromatic compound involves the use of at least one mole of the former for each mole of the latter with which it enters into reaction.

The perchloryl fluoride is preferably introduced in gaseous form into the catalyst-containing mass, but it may be introduced as a liquid, at all times using proper precautions pertaining to the handling of perchloryl fluoride.

The coupling agents used in carrying out our invention are acidic compounds of the type known to the art as Friedel-Crafts catalysts. Examples of such coupling agents are AlCl$_3$, AlBr$_3$, SbCl$_5$, TiCl$_4$, FeCl$_3$, SnCl$_4$, BF$_3$ and TaCl$_5$. The preferred coupling agent is AlCl$_3$. Use of AlCl$_3$ is especially preferred because of the ability of the AlCl$_3$ to convert the HF released in the coupling reaction into a mixture of AlF$_3$—AlCl$_3$ and HCl, thus eliminating the problem of having HF in the reactor system. The coupling agent is prepared and used in the manner commonly employed in the utilization of catalysts in Friedel-Crafts types of reactions, a procedure well known to those working in the art. The Friedel-Crafts catalysts used in the coupling reaction are sensitive to water; therefore, in preferred practice, dry aromatic compounds are employed as reactants, and the reaction system is maintained substantially anhydrous. In the preferred manner of practice of the process of this invention, using AlCl$_3$ as coupling agent, it has been found that after HF is liberated from the perchloryl fluoride reactant, and the AlF$_3$·AlCl$_3$ mixture forms, the reactivity of the AlCl$_3$ substantially decreases. The consumption of AlCl$_3$, therefore, is about mole for mole with the perchloryl fluoride and the aromatic compound. With most of the above-named coupling agents, acceptable results may be obtained when using commercial aromatic compounds which normally contain small amounts of water. In such cases, the molar ratio of coupling agent to perchloryl fluoride is at least 1:1 and preferably somewhat greater. The presence of any large amount of water is undesirable, because of the deleterious effect on the catalyst.

In carrying out the coupling reaction, the acidic catalyst used as the coupling agent is preferably added to the aromatic compound, with the latter being used alone in excess or dissolved in a solvent, and the perchloryl fluoride is then passed into the mixture, which is preferably held at 0° C. to 80° C. by cooling. It is preferred in many instances to employ as solvent or diluent the same aromatic compound which is being reacted, it merely being necessary in such cases to make certain that said compound is present in the reaction mixture in substantial excess over the stoichiometric amount required for reaction. This procedure is particularly applicable when the aromatic reactant is a liquid, such as benzene, toluene, or a relatively low-melting solid, such as p-dichlorobenzene. When the aromatic compound itself serves as the solvent, it is used in large excess, and preferably a ratio of from 5 to 15 volumes of said compound per volume of catalyst is used.

Alternatively, the perchlorylation reaction can be advantageously carried out in the presence of a non-aqueous solvent or diluent which preferably is inert to the reactants, such as petroleum ether, diethyl ether and other lower dialkyl ethers, liquid aliphatic hydrocarbons, e.g., hexane, ligroin, etc. When an added solvent is used, volumes similar to thoses above are used, so that the liquid-to-solids volume ratio is preferably from about 5:1 to about 15:1.

As in the case with all chemical reactions, it is good practice to maintain the reaction mixture at temperatures sufficiently high to cause reaction to proceed at a reasonable rate, but not so high as to cause extensive side reactions and/or decomposition of reactants and product. Temperatures ranging from about —15° C. to about 280° C. are satisfactory, a preferred range being between 0° C. to 80° C. In many instances the reaction proceeds quite smoothly at ordinary temperatures, such as between 20° C. and 30° C., but for most reactions a temperature range of from 0° C. to 15° C. is especially preferred.

Pressure is not critical, and the reaction may be conducted at atmospheric pressure, sub-atmospheric pressure, or superatmospheric pressure. Atmospheric pressure is more convenient and is frequently preferred.

Agitation of the reaction mixture is beneficial in increasing the rate of reaction.

The perchlorylated product is recovered from the reaction mass by procedures customarily used in carrying out Friedel-Crafts reactions. See, for example, P. H. Groggins, "Unit Processes in Organic Synthesis," 4th edition, Chapter XIV, McGraw-Hill Book Company, Inc., N.Y. (1952).

In the preparation of the secondary class of our novel aromatic compounds, a perchlorylaromatic compound of the primary class is reacted by means of customary reactions applicable to organic compounds in a non-aqueous solution under mildly alkaline, neutral, or acid conditions with a reactant substance containing a functional group or groups which is to be introduced either into the nucleus of the perchlorylaromatic compound or into the substituent group, if one is present, on the aromatic radical. Examples of such reactions are nitration, sulfonation, halogenation, reduction, hydrogenation, amination, cyanation, diazotization, hydrolysis, esterification, oxygenation, coupling condensation, arylation, etc. In other words our perchlorylated aromatic compounds are subject to the whole spectrum of reactions known in general to occur below 280° C. to aromatic compounds under mildly alkaline, neutral or acid conditions. Procedures useful for transforming our primary perchlorylaromatic compounds into our secondary class of perchloryl aromatic compounds may be found in most standard textbooks and in the chemical literature. Typical of such sources are Vartkes Migrdichian, "Organic Synthesis," Vols. I and II, Reinhold Publishing Corporation, N.Y. (1957); Kirk-Othmer, "Encyclopedia of Chemical Technology," "The Interscience Encyclopedia, Inc.," N.Y. (1947, 1957); and Roger Adams et al. "Organic Reactions," Vols. I–IX, John Wiley & Sons, Inc., N.Y. (1942–1957).

The

group is highly stable chemically under acid or neutral conditions and is not affected by the reactants used for the introduction of new groups into the aromatic nucleus or into its already present substituent groups. The bond between the aromatic radical and the perchloryl radical is stable up to about 280° C., around which temperature the perchlorylaromatic compounds decompose explosively. The perchloryl radical is, however, more or less readily replaced by a hydroxy group upon treatment with an inorganic or organic base under strongly alkaline conditions. Depending upon other substituents present, this replacement might require anything from less than an hour to a few days of reaction time at room temperature. The reaction occurs more readily upon heating. Alkaline conditions should therefore usually be avoided except for mildly alkaline conditions, i.e., below a pH which is high enough to cause removal of the perchloryl radical, maintained for short periods of time at moderate temperatures. It has been found, in one unusual case illustrated by Examples 74 and 75 (disclosed and claimed in copending application of Francis L. Scott, Serial No. 841,684, filed September 23, 1959), that because of the presence of a fluoro substituent the perchloryl group was stable in strongly alkaline solution held at its boiling point for many hours.

So far as the reactions other than perchlorylation are concerned, e.g., the chlorinations, other halogenations, nitrations, reductions, diazotizations, acetylations, Sandmeyer reactions, hydrolyses, phenylations, couplings, sulfonations, alkylations, haloalkylations, and the like, procedures known in the art that can be carried out under mildly alkaline, neutral or acid conditions are employed. These procedures include the selection from the known prior art processes of suitable solvent media, suitable temperatures and suitable catalysts, where appropriate.

The perchlorylaromatic compounds of our invention are liquids and solids. Although their general physical and chemical properties are dependent on the organic group of the particular aromatic compound coupled with the perchloryl radical of perchloryl fluoride, the presence of the

radical significantly alters the character of the original organic compound. For example, benzene, whose boiling point is about 80° C., reacts with $ClO_3F$, B.P. —47.5° C., to form perchlorylbenzene whose boiling point is 232° C.

We have found that our novel perchlorylaromatic compounds, for example perchlorylbenzene, possess explosive properties. They are thus useful as explosive charges for blasting and for the manufacture of explosive devices. They are also useful as high energy fuels. They can be used as intermediates in the preparation of a wide variety of compounds useful in pharmaceutical and dye applications. They can be used as additives for fuels used in internal combustion engines, particularly as cetane improvers in diesel fuels.

The following examples, which are by way of illustration and not of limitation, illustrate the preparation and usefulness of the compounds of the invention. The parts are by weight unless stated otherwise.

*Example 1*

133 parts of $AlCl_3$ are suspended with agitation in about 2600 parts of benzene in a vessel in a cooling bath. Perchloryl fluoride gas is passed slowly into the benzene-$AlCl_3$ mixture, which is maintained at a temperature of about 40° C. HCl gas is evolved from the reaction mass. Addition of the perchloryl fluoride is stopped when about 100 parts have been added and HCl evolution has ceased. The reaction mass is added to about twice its volume of water. The mass is then steam-distilled. The benzene layer thus recovered is evaporated, and the perchlorylbenzene contained therein, about 70 parts, is recovered as a pale yellow oil. Upon distillation of the oil under high vacuum, about 62 parts of perchlorylbenzene are recovered as a colorless, oily liquid. Determination of the physical constants of perchlorylbenzene prepared as described above gave the following values: B.P., 232° C.; F.P., —3° C.; refractive index $n_D^{20}$, 1.5236, and density 30°/4° C., 1.185. Analysis of the perchlorylbenzene gave for the formula $C_6H_5ClO_3$ the following values:

Calculated: M.W., 160.5: C, 44.90; H, 3.14; Cl, 22.08.
Found: M.W., 165; C, 44.80, H, 3.26; Cl, 22.27.

The structure of perchlorylbenzene was determined from its infrared spectrum to be

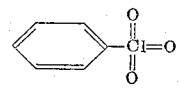

The infrared spectrum of perchlorylbenzene shows absorption between 1670 cm.⁻¹ and 2000 cm.⁻¹ characteristic of monosubstituted aromatics. The most striking feature is a very strong band at 1101 cm.⁻¹. Both perchloryl fluoride and perchloric acid absorb strongly in this region, at 1312 cm.⁻¹ and 1032 cm.⁻¹, respectively. This band is assigned to a Cl—O stretching frequency.

The structure of perchlorylbenzene was further confirmed with ultraviolet absorption spectrum. Three distinct peaks, characteristic of benzene derivatives, were obtained at 255.5, 261.5 and 268.0 mu. The maximum at 261.5 mu is a higher wave length from that of benzene at 254.5 mu, characteristic of substituted derivatives of benzene and comparable to chlorobenzene which shows a maximum at 265 mu, thus evidencing the C—Cl structure.

*Example 2*

Meta-xylene, containing $AlCl_3$ in suspension, was reacted with perchloryl fluoride in the manner described in Example 1 to form 2,4-dimethyl-perchlorylbenzene. Reaction to form the perchlorylated compound was observed to take place by the evolution of HCl gas and blackening of the AlCl$_3$ catalyst.

*Example 3*

Eight parts of anhydrous aluminum chloride were suspended in about 90 parts of p-xylene and the mixture cooled to 10° C. with an external cold water bath. Perchloryl fluoride gas was bubbled through the mixture slowly at 10–15° C. HCl gas was evolved and the AlCl$_3$ catalyst became a fine black suspension. When evolution of HCl ceased (about 2 hours), the reaction mixture was filtered. Steam distillation of the filtrate, followed by separation and drying of the xylene layer over MgSO$_4$ and evaporation under vacuum, gave 8 parts of a high boiling liquid. Vacuum distillation gave the pure 2,5-dimethylperchlorylbenzene, a colorless liquid, B.P. 78° C. (p. 2 mm.); M.P. 27–28° C.

*Analysis.*—Calculated for C$_8$H$_9$ClO$_3$: C, 50.94; H, 4.81. Found: C, 51.99; H, 4.98.

Infrared analysis showed a strong Cl—O band at 1189 cm.$^{-1}$ comparable to perchlorylbenzene at 1191 cm.$^{-1}$ The spectrum in the 1670–2000 cm.$^{-1}$ region indicated a 1,2,5-trisubstituted aromatic ring.

*Example 4*

Perchloryl fluoride gas was bubbled through a suspension of 13 parts of anhydrous aluminum chloride in about 100 parts of fluorobenzene at 25–30° C. HCl gas was evolved. Temperature was maintained by means of a water cooling bath. When evolution of HCl was complete the fine black solids were filtered from the fluorobenzene solution before steam distillation. The organic layer was separated and dried over anhydrous MgSO$_4$. The fluorobenzene was evaporated under vacuum, leaving a pale yellow oil (12 parts). Vacuum distillation gave the pure 4-fluoroperchlorylbenzene, B.P. 53° C./0.25 mm.; $n_D^{20}$, 1.5051. *Analysis.*—Calculated for C$_6$H$_4$ClFO$_3$: C, 40.36; H, 2.25; Cl, 1986. Found: C, 40.69; H, 3.28; Cl, 20.32.

Infrared spectrum showed a para-substitution pattern in the 1670–2000 cm.$^{-1}$ region and the strong ClO—O band at 1198 cm.$^{-1}$.

*Example 5*

Perchloryl fluoride gas was bubbled through a solution of 3 parts of anhydrous AlBr$_3$ in about 225 parts of benzene at 5° C. for one hour. Five parts of perchloryl fluoride were used. HBr gas was evolved. The catalyst turned to a fine black suspension. Dilution of the reaction mass in water and steam distillation resulted in recovery of perchlorylbenzene. The product was shown by infrared to be identical to the perchlorylbenzene prepared using AlCl$_3$ as the catalyst.

*Example 6*

To a solution of 1 part of 3-nitroperchlorylbenzene in about 50 parts of ethanol and about 50 parts of concentrated HCl were added 6 parts of stannous chloride in small amounts with stirring. The mixture was heated to 50–60° C. and held at that temperature for 20 minutes after complete addition of the stannous chloride. It was then poured over ice and water and neutralized with 10% NaOH solution. The mixture was extracted three times with diethyl ether. The other extracts were combined, dried over MgSO$_4$ and evaporated. 3-aminoperchlorylbenzene was recovered in the form of a crude pale yellow liquid. Infrared analysis showed the Cl—O band and the N—H doublet. The NO$_2$ band of the starting nitro compound was eliminated. M.P. 320° C.

*Example 7*

20 parts of perchlorylbenzene in 80 parts of concentrated H$_2$SO$_4$ were treated with a nitrating mixture consisting of about 25 parts concentrated H$_2$SO$_4$ and 14 parts of concentrated nitric acid at 20° C. to 30° C. for a period of about one hour. The reaction mass was then poured over ice. 22 parts of a yellow solid were filtered from the mixture. Upon recrystallization of the solid from a benzene-petroleum ether solvent a mass of pale yellow needle-shaped crystals were recovered, M.P. 49°–50° C. The product was identified by analysis as 3-nitroperchlorylbenzene. *Analysis.*—Calculated for C$_6$H$_4$ClNO$_5$: Cl, 17.25; N, 6.81. Found: Cl, 17.27; N, 6.92. The structure of the compound was determined from its infrared spectrum. A very strong absorption band appears at 1211 cm.$^{-1}$ and is assigned to the Cl—O stretching frequency. Absorption at 1350 cm.$^{-1}$ and probably 1529 cm.$^{-1}$ indicates a nitro substituent, while the pattern between 1670–2000 cm.$^{-1}$ is characteristic of substitution.

*Example 8*

Freshly ground AlCl$_3$ was added to 10 ml. of diethyl ether until the ether was saturated. An additional 4 gms. of AlCl$_3$ and 10 ml. of benzene were then added. Perchloryl fluoride was bubbled into the mixture at room temperature. The temperature rose to 40° C. and remained there during the addition of the perchloryl fluoride. When the temperature began to fall, indicating the end of the reaction, the reaction mass was steam distilled. Perchlorylbenzene was recovered from the distillate as a heavy oil. Its identity was confirmed by infrared analysis.

The example demonstrates the practicability of the use of an excess of AlCl$_3$ in an ether solvent.

*Example 9*

Using the procedure described in Example 8 technical nitrobiphenyl was reacted with perchloryl fluoride and excess AlCl$_3$ at about 45° C. The reaction was stopped after about 3 hours. The reaction mass was dispersed into ice water. The product was recovered by ether extraction and purified. Infrared analysis confirmed presence of the perchloryl group on the nitrobiphenyl structure.

*Example 10*

Using the procedure described in Example 8 phenol was reacted with perchloryl fluoride and AlCl$_3$ at about 40° C. The product formed, 4-hydroxyperchlorylbenzene, was shown by infrared to possess the perchloryl group.

*Example 11*

Anhydrous HCl was passed into a solution of 3-aminoperchlorylbenzene in anhydrous ether. A white precipitate formed. The precipitate was recovered by filtration and was washed with anhydrous ether and dried. Vacuum sublimation gave the pure white solid hydrochloride of 3-aminoperchlorylbenzene

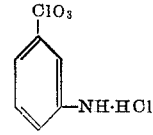

M.P.—decomposes.

*Analysis.*—Calculated for C$_6$H$_6$Cl$_2$NO$_3$: C, 33.98; H, 3.33; N, 6.60. Found: C, 32.86; H, 3.96; N, 6.00.

*Example 12*

The acetyl derivative of 3-aminoperchlorylbenzene was prepared by treating 3-aminoperchlorylbenzene with acetic anhydride in acetic acid at 30–40° C. and recrystallized from ethanol to give more pure colorless needles of

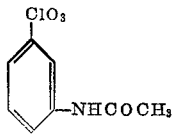

M.P. 136–137° C.

*Analysis.*—Calculated for $C_8H_8ClNO_4$: C, 44.15; H, 3.71; N, 6.44. Found: C, 44.21; H, 3.74; N, 6.55.

Example 13

Perchlorylbenzene was heated above its atmospheric boiling point in a closed vessel. At about 285° C. it detonated vigorously.

Example 14

(a) Perchlorylbenzene in liquid form was subjected to impact on a detonating block. The compound exploded.

(b) Perchlorylbenzene was solidified by cooling and was subjected to impact on a detonating block. Explosion of the compound resulted.

Example 15

Meta-nitroperchlorylbenzene was subjected to impact on a detonating block. The compound exploded.

Example 16

4-nitroperchlorylbenzene is charged into an elongated bomb-casing equipped with a recessed tube for insertion of a blasting cap. A plurality of such bomb-casings is inserted into bored holes in a bed of marble. Upon detonation of the blasting caps by means of an electrical detonator, the 4-nitroperchlorylbenzene is exploded and ruptures the marble into easily removed sections.

In the following examples are shown additional species of our perchlorylaromatic compounds and the steps by which they can be made. The step of monoperchlorylation is carried out substantially as disclosed in Example 1. The steps of chlorination, bromination, iodination, nitration, amination, reduction, diazotization, Sandmeyer reaction, biphenyl synthesis, hydrolysis, etc. are carried out according to known procedures.

| Ex. No. | Starting compound | Reaction | Perchlorylaromatic product |
|---|---|---|---|
| 17 | Monochlorobenzene | Monoperchlorylation | 4-Cl-C$_6$H$_4$-ClO$_3$ |
| 18 | Phenol | do | 4-HO-C$_6$H$_4$-ClO$_3$ |
| 19 | Toluene | do | 4-CH$_3$-C$_6$H$_4$-ClO$_3$ |
| 20 | C$_6$H$_5$-ClO$_3$ | Monochlorination | 3,4-Cl$_2$-C$_6$H$_3$-ClO$_3$ |
| 21 | 4-CH$_3$-C$_6$H$_4$-ClO$_3$ | Nitration and reduction | 4-CH$_3$-3-NH$_2$-C$_6$H$_3$-ClO$_3$ |
| 22 | 4-CH$_3$-3-NH$_2$-C$_6$H$_3$-ClO$_3$ | Mononitration | 4-CH$_3$-3-NH$_2$-5-NO$_2$-C$_6$H$_2$-ClO$_3$ |
| 23 | Monofluorobenzene | Monoperchlorylation | 4-F-C$_6$H$_4$-ClO$_3$ |

| Ex. No. | Starting compound | Reaction | Perchlorylaromatic product |
|---|---|---|---|
| 24 | 4-fluorophenyl-ClO₃ | Trichlorination | 2,3,5-trichloro-4-fluorophenyl-ClO₃ |
| 25 | 4-hydroxyphenyl-ClO₃ | Tetrachlorination | 2,3,5,6-tetrachloro-4-hydroxyphenyl-ClO₃ |
| 26 | phenyl-ClO₃ | Sulfonation | 4-SO₃H-phenyl-ClO₃ |
| 27 | Anisole | Monoperchlorylation | 2-OCH₃-phenyl-ClO₃ |
| 28 | Monochlorobenzene | do | 2-Cl-phenyl-ClO₃ |
| 29 | 2-chlorophenyl-ClO₃ | Mononitration | 2-Cl-5-NO₂-phenyl-ClO₃ |
| 30 | 4-fluorophenyl-ClO₃ | Displacement of fluorine by thioalkyl group (See Example 74). | 4-SCH₃-phenyl-ClO₃ |
| 31 | Nitrobiphenyl | Monoperchlorylation | NO₂-biphenyl-ClO₃ |
| 32 | NO₂-biphenyl-ClO₃ | Mononitration | dinitro-biphenyl-ClO₃ |
| 33 | 2-Cl-4-NO₂-phenyl-ClO₃ | Reduction | 2-Cl-4-NH₂-phenyl-ClO₃ |
| 34 | 2-Cl-4-NH₂-phenyl-ClO₃ | Mononitration as acetyl derivative | 2-Cl-4-NH₂-5-NO₂-phenyl-ClO₃ |

| Ex. No. | Starting compound | Reaction | Perchlorylaromatic product |
|---|---|---|---|
| 35 | Toluene | Monoperchlorylation | 2-ClO₃-toluene (o-ClO₃-C₆H₄-CH₃) |
| 36 | o-ClO₃-toluene | Trichlorination | 3,4,5-trichloro-2-ClO₃-toluene |
| 37 | o-ClO₃-toluene | do | 3,5-dichloro-2-ClO₃-toluene (with Cl at 4-position) |
| 38 | o-ClO₃-chlorobenzene | Perchlorination | pentachloro-ClO₃-benzene |
| 39 | p-dibromobenzene | Monoperchlorylation | 2-ClO₃-1,4-dibromobenzene |
| 40 | p-xylene | do | 2-ClO₃-p-xylene |
| 41 | 2-ClO₃-p-xylene (ClO₃, CH₃, CH₃) | Nitration, reduction, diazotization, Sandmeyer reaction. | 2-ClO₃-5-CN-p-xylene |
| 42 | p-difluorobenzene | Monoperchlorylation | 2-ClO₃-1,4-difluorobenzene |
| 43 | 2-ClO₃-1,4-difluorobenzene | Dichlorination | 2-ClO₃-1,4-difluoro-3,5-dichlorobenzene |
| 44 | 2-ClO₃-1,4-difluorobenzene | do | 2-ClO-1,4-difluoro-3,6-dichlorobenzene |

| Ex. No. | Starting compound | Reaction | Perchlorylaromatic product |
|---|---|---|---|
| 45 | $C_2H_5$-, $C_2H_5$- substituted benzene | Monoperchlorylation | $ClO_3$-, $C_2H_5$-, $C_2H_5$- substituted benzene |
| 46 | $ClO_3$-, Cl-, Cl- substituted benzene | Nitration, reduction, diazotization and hydrolysis. | $ClO_3$-, OH-, Cl-, Cl- substituted benzene |
| 47 | $ClO_3$-, Cl- substituted benzene | Nitration, reduction, diazotization and biphenyl synthesis. | $ClO_3$-, Cl-, Cl-, phenyl- substituted benzene |
| 48 | Br-, Br- substituted benzene | Monoperchlorylation | $ClO_3$-, Br-, Br- substituted benzene |
| 49 | $ClO_3$-, Br-, Br- substituted benzene | Dichlorination | $ClO_3$-, Cl-, Cl-, Br-, Br- substituted benzene |
| 50 | $CH_3$-, $CH_3$- substituted benzene | Monoperchlorylation | $ClO_3$-, $CH_3$-, $CH_3$- substituted benzene |
| 51 | $ClO_3$-, $CH_3$-, $CH_3$- substituted benzene | Chlorination of methyl radicals | $ClO_3$-, $CH_2Cl$-, $CH_2Cl$- substituted benzene |
| 52 | Cl-, $CH_3$-, $CH_3$- substituted benzene | Monoperchlorylation | $ClO_3$-, $CH_3$-, $CH_3$-, Cl- substituted benzene |
| 53 | $CH_3$-, $CH_3$-, $CH_3$- substituted benzene | ...do... | $ClO_3$-, $CH_3$-, $CH_3$-, $CH_3$- substituted benzene |
| 54 | $ClO_3$-, $CH_3$-, $CH_3$-, $CH_3$- substituted benzene |  | $ClO_3$-, $CH_3$-, $CH_3$-, $NO_2$-, $CH_3$- substituted benzene |

| Ex. No. | Starting compound | Reaction | Perchlorylaromatic product |
|---|---|---|---|
| 55 | 1,2,3-trichlorobenzene | Monoperchlorylation | 2,3,5-trichloro-ClO$_3$-benzene |
| 56 | 1-ClO$_3$-3,4,5-trichlorobenzene | Nitration, reduction, diazotization and iodination. | 1-ClO$_3$-2-I-3,4,5-trichlorobenzene |
| 57 | 1-F-3,4-dichlorobenzene | Monoperchlorylation | 1-ClO$_3$-2-Cl-4-Cl-5-F-benzene |
| 58 | 1-ClO$_3$-2-Cl-4-Cl-5-F-benzene | Dichlorination | 1-ClO$_3$-2-Cl-3-Cl-4-F-6-Cl-benzene |
| 59 | mesitylene (1,3,5-trimethylbenzene) | Monoperchlorylation | 2-ClO$_3$-1,3,5-trimethylbenzene |
| 60 | 2-ClO$_3$-1,3,5-trimethylbenzene | Nitration, reduction, diazotization and iodination. | 2-ClO$_3$-4-I-1,3,5-trimethylbenzene |
| 61 | 1,2,3,5-tetramethylbenzene | Monoperchlorylation | ClO$_3$-tetramethylbenzene |
| 62 | 2-ClO$_3$-1,3,5-trimethylbenzene | Nitration and reduction | 2-ClO$_3$-4-NH$_2$-1,3,5-trimethylbenzene |
| 63 | 1-Cl-4-F-benzene | Monoperchlorylation | 1-ClO$_3$-2-Cl-4-F-benzene |
| 64 | ClO$_3$-benzene | Nitration, reduction, diazotization, and coupling with 2-naphthol (β-naphthol-OH) | ClO$_3$-phenyl-N:N-(2-hydroxy-naphthyl) azo dye |

| Ex. No. | Starting compound | Reaction | Perchlorylaromatic product |
|---|---|---|---|
| 65 | $ClO_3$-C$_6$H$_4$-NHCOCH$_3$ | Mononitration | $ClO_3$, $NO_2$, NHCOCH$_3$ substituted benzene |
| 66 | $ClO_3$-C$_6$H$_4$-Cl | Nitration, reduction, second nitration and reduction. | $ClO_3$, $NH_2$, Cl, $NH_2$ substituted benzene |
| 67 | $ClO_3$-C$_6$H$_5$ | Nitration, reduction, diazotization, and decomposition of the diazonium compound formed. | Biphenyl with $ClO_3$ on each ring |
| 68 | $ClO_3$-C$_6$H$_5$ | Nitration, reduction | $ClO_3$-C$_6$H$_4$-N=N-C$_6$H$_4$-$ClO_3$ |
| 69 | $ClO_3$-C$_6$H$_4$-NO$_2$ | Controlled reduction | $ClO_3$-C$_6$H$_4$-N(O)N-C$_6$H$_4$-$ClO_3$ |
| 70 | $ClO_3$-C$_6$H$_4$-NO$_2$ | ...do... | $ClO_3$-C$_6$H$_4$-NH-NH-C$_6$H$_4$-$ClO_3$ |
| 71 | $ClO_3$-C$_6$H$_5$ | Chloromethylation | $ClO_3$-C$_6$H$_4$-CH$_2$Cl |

Example 72

One part of 3-aminoperchlorylbenzene hydrochloride is dissolved in 20% HCl and diazotized with sodium nitrite solution at 0–5° C. to form a solution containing perchlorylbenzene-3-diazonium chloride. Yellow crystals of 3,3-diperchloryldiazoaminobenzene precipitate and are removed by filtration. To this filtrate is added 1 part of β-naphthol dissolved in dilute NaOH. The dye product, 3-(β-hydroxynaphthylazo)-perchlorylbenzene, precipitates in the form of dark orange crystals. The product is purified by recrystallization from chloroform, M.P. 200–201° C.

*Anal.*—Calc. for C$_{16}$H$_{11}$ClN$_2$O$_4$: C, 58.10; H, 3.35. Found: C, 57.34; H, 3.45.

Infrared absorption gives a maximum at 464 mμ, orange region of the visible spectrum.

Other nitrogen-containing derivatives of perchlorylaromatic compounds can be prepared by amination of a perchlorylaromatic compound, e.g., perchlorylbenzene, followed by substitution of the hydrogen atoms of the amine group to form acetamido-, hydrazino-, triazolyl-, phenylazo-, or naphthylazoperchlorylaromatic compound, using known procedural methods for carrying out each of said synthesis steps.

Example 73

A piece of wool cloth is thoroughly wetted with hot water and is immersed in a dye bath held at 120° F. and containing 1.0% of 3-(β-hydroxynaphthylazo)-perchlorylbenzene, 20% Glauber's salt crystals and 5% of 28% acetic acid. All weights are based on the weight of the dry cloth. The temperature is raised rapidly to boiling in about 15 minutes and the boiling is continued for 1 hour. 1.0% of sulfuric acid is then added and boiling continued for another 30 minutes. The wool cloth is rinsed in water, extracted and dried. A deep orange color is thus imparted to the cloth. The cloth withstands prolonged exposure in sunlight without appreciable loss of color by fading.

Similarly, dyes may be made from any of the perchlorylaromatic compounds of this invention. If the compound does not already contain an amino group such a group is introduced by nitration and reduction in accordance with Examples 6 and 7. The perchlorylaromatic amine is then diazotized and the perchlorylaromatic diazonium compound reacted with a suitable auxochrome compound, i.e., one containing —OH, —NH$_2$, —OCH$_3$, —NH·CH$_3$
—N(CH$_3$)$_2$, —NH·C$_6$H$_5$, —N(CH$_3$)C$_6$H$_5$
—NH·SO$_2$·C$_6$H$_5$, —NH·OH, or —NH·NH$_2$ to furnish a dye, as described in Example 72.

*Example 74*

4-fluoroperchlorylbenzene (4.0 g., 0.0233 mole) and about 200 ml. of sodium methoxide in methanol (0.221 mole) are refluxed together. Reaction is substantially complete in about 90 minutes. The cooled reaction mixture is diluted with water and extracted with ether. The ether extract is dried over anhydrous magnesium sulfate, filtered, and evaporated to recover the product, 4-methoxyperchlorylbenzene, an oily liquid, $n_D^{28}$, 1.5307. Infrared spectrum confirms presence of the perchloryl and methoxide groups.

*Example 75*

A mixture of 4 g. of 4-fluoroperchlorylbenzene (0.0233 mole), 2.45 g. of thiophenol (0.0233 mole) and about 100 ml. of 0.221 molar sodium methoxide in methanol are refluxed for 18 hours. The cooled reaction mixture is diluted with water and extracted with ether. The ether extract is dried over anhydrous magnesium sulfate, filtered, and the ether evaporated. The product, 4-thiophenylperchlorylbenzene, is an oily liquid, $n_{26}^D$, 1.5778. Infrared spectrum confirms presence of the perchloryl and thiophenyl groups.

*Example 76*

Perchlorylbenzene is dissolved in an excess of tetrachloroethane. About 1% of anhydrous FeCl$_3$, based on the weight of perchlorylbenzene, is added to the solution as a catalyst. Gaseous chlorine is added to the solution with stirring, and cooling of the reaction vessel, maintaining a temperature of about 10° C. to 15° C. When about 60% of the theoretically required amount of chlorine has been added, the chlorination is stopped, to avoid over-chlorination of the 4-chloroperchlorylbenzene product. A small amount of 3,4-dichloroperchlorylbenzene is formed as by-product. The 4-chloroperchlorylbenzene is recovered from the solvent as an oily liquid.

Other nuclearly chlorinated compounds can be similarly prepared by continuing the chlorination at a temperature below 280° C. to substitute up to 5 atoms of chlorine into the perchlorylbenzene ring. In this way, tri-, tetra-, and pentachloroperchlorylbenzenes can be obtained. Other catalysts may also be used, e.g., metallic iron, iodine, aluminum-mercury couple, and antimony monochloride. Bromo- and iodoperchlorylbenzene compounds can similarly be prepared, using the appropriate halide catalyst, e.g., FeBr$_3$, or I$_2$ or metallic iron.

*Example 77*

Homologs of perchlorylbenzene can be nuclearly halogenated in the same manner as perchlorylbenzene in Example 76 to form alkylhaloperchlorylaryl compounds. Perchloryloxylene, e.g., 2,4-dimethylperchlorylbenzene is progressively chlorinated, first at 5°–10° C. and then by raising the temperature gradually to about 60° C., with gaseous chlorine in the presence of ferric chloride catalyst in a suitable solvent, preferably tetrachloroethane, or in CCl$_4$, nitrobenzene, ether, alcohol, CHCl$_3$ or glacial acetic acid, to form 3-chloro-2,4-dimethylperchlorylbenzene, 3,5-dichloro-2,4-dimethylperchlorylbenzene, and 2,4-dimethyl-3,5,6-trichloroperchlorylbenzene.

The corresponding bromo-2,4-dimethylperchlorylbenzenes are similarly formed from Br$_2$, using ferric bromide catalyst.

*Example 78*

Haloalkylperchlorylbenzene compounds are prepared by substitution of hydrogen atoms in the side chain of an alkylperchlorylbenzene compound, e.g., 2,4-dimethylperchlorylbenzene, with halogen at higher temperatures than used in Examples 76 and 77 or by illumination of the reaction mass in the absence of catalysts.

Chlorination of 2,4-dimethylperchlorylbenzene is carried out in a glass tower packed with glass rings and illuminated with mercury lamps (ultra-violet light). The lamps are spaced about 4 feet apart. 2,4-dimethylperchlorylbenzene is heated to 65° C. to 75° C. and is fed into the top of the tower at a uniform rate. Dry chlorine gas is passed up the tower. The temperature of the tower is maintained just below the reflux point. 2,4-chloromethylperchlorylbenzene is recovered as the product.

The corresponding 2,4-bromomethyl- and 2,4-iodomethylperchlorylbenzenes are similarly prepared by using Br$_2$ and I$_2$ respectively in place of the Cl$_2$.

*Example 79*

Perchlorylbenzene and its homologs, particularly the highly alkylated derivatives and those containing hydroxyl groups in the nucleus, can be chloromethylated by reacting the perchlorylaryl compound with formaldehyde and hydrochloric acid at a temperature below 280° C. Sulfuric acid, the chlorides of zinc, aluminum or tin are effective catalysts, although with the higher alkylated perchlorylaromatic compounds, e.g., 2,4,5-trimethylperchlorylbenzene, a catalyst is unnecessary. Thus, 3-perchlorylbenzyl chloride is readily obtained by reacting perchlorylbenzene with formaldehyde and dry halogen chloride in the presence of sulfuric acid at room temperature.

The corresponding 3-perchlorylbenzyl bromide and -iodide are similarly prepared by using dry HBr and HI in place of the dry HCl.

*Example 80*

Perchlorylbenzene and its homologs are readily sulfonated with concentrated sulfuric acid by heating a mixture of the perchlorylaryl compound with the acid at a sufficiently high temperature below 280° C. Thus, perchlorylxylenesulfonic acid, i.e., 2,4-dimethyl-5-sulfoperchlorylbenzene, is obtained by adding 2,4-dimethylperchlorylbenzene to about the theoretically required weight of about 100% sulfuric acid and heating the mixture at about 80° C.–90° C. until the 2,4-dimethylperchlorylbenzene is dissolved.

*Example 81*

The diazotized derivatives of aminoperchlorylbenzene and its homologs are readily obtained by reacting aminoperchlorylaromatic compounds with nitrous acid, or materials forming nitrous acid in solution in concentrated mineral acid, such as H$_2$SO$_4$, HCl, HBr, at temperature below 280° C. Thus, 3-perchlorylbenzenediazonium chloride is obtained by diazotizing 3-aminoperchlorylbenzene with sodium nitrite in concentrated HCl at about 0° C.

Many different embodiments of this invention may be made without departing from the scope and spirit of it, and it is to be understood that our invention includes also such embodiments and is not limited by the above description.

This application is a continuation-in-part of Serial No. 686,582 filed September 27, 1957, now abandoned.

We claim:

1. A compound having the formula

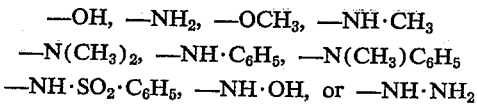

wherein Ar is an aromatic radical attached to the

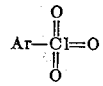

group through a carbon of a carbocyclic aromatic ring said ring containing no more than one

group.

2. An alkylperchlorylbenzene compound having the formula

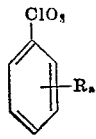

wherein R is an alkyl radical containing from 1 to 12 carbon atoms inclusive and $a$ is an integer from 1 to 4.

3. 2,4-dimethylperchlorylbenzene.
4. 2,5-dimethylperchlorylbenzene.
5. Perchlorylbenzene.
6. 3-(4-nitrophenyl)-perchlorylbenzene.
7. A process for preparing a perchlorylaromatic compound which comprises reacting perchloryl fluoride in the presence of a Friedel-Crafts catalyst at a temperature below 280° C. with a compound selected from the group consisting of benzene, alkylbenzene, alkylhalobenzene, alkoxybenzene, alkylaminobenzene, halobenzene, phenol, nitrobiphenyl and biphenyl.
8. The process according to claim 7 wherein the reaction is carried out in a nonaqueous liquid medium selected from the group consisting of lower dialkyl ethers and aliphatic hydrocarbon.
9. The process according to claim 7 wherein the temperature is in the range from about 0° C. to 80° C.
10. The process according to claim 7 wherein the catalyst is $AlCl_3$.
11. The process according to claim 7 wherein the catalyst is $AlBr_3$.

No references cited.

UNITED STATES PATENT OFFICE
CERTIFICATE OF CORRECTION

Patent No. 3,067,211            December 4, 1962

Charles E. Inman et al.

It is hereby certified that error appears in the above numbered patent requiring correction and that the said Letters Patent should read as corrected below.

Column 1, line 32, for "stubstituents" read -- substituents --; column 9, line 39, for "1986" read -- 19.86 --; line 42, for "ClO-O" read -- Cl-O --; line 70, for "M.P. 320° C." read -- M.P. 32° C. --; column 23, line 60, for "Perchloryloxylene" read -- Perchloroylxylene --; column 26, line 12, for "hydrocarbon" read -- hydrocarbons --.

Signed and sealed this 28th day of May 1963.

(SEAL)
Attest:

ERNEST W. SWIDER
Attesting Officer

DAVID L. LADD
Commissioner of Patents